Nov. 12, 1929.  E. B. KIRK  1,735,005
APPARATUS FOR TESTING EYES
Filed Jan. 25, 1926  2 Sheets-Sheet 2
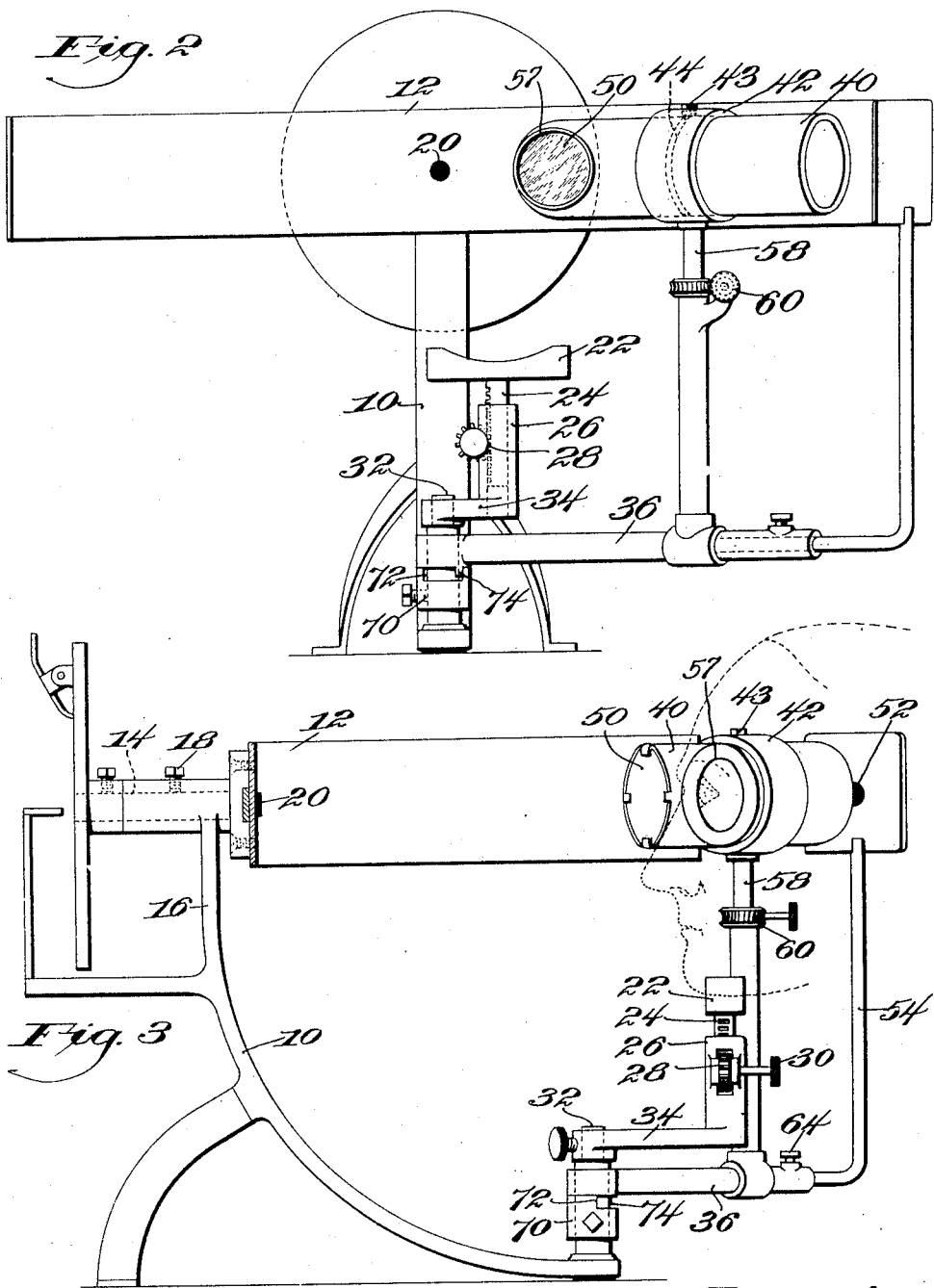

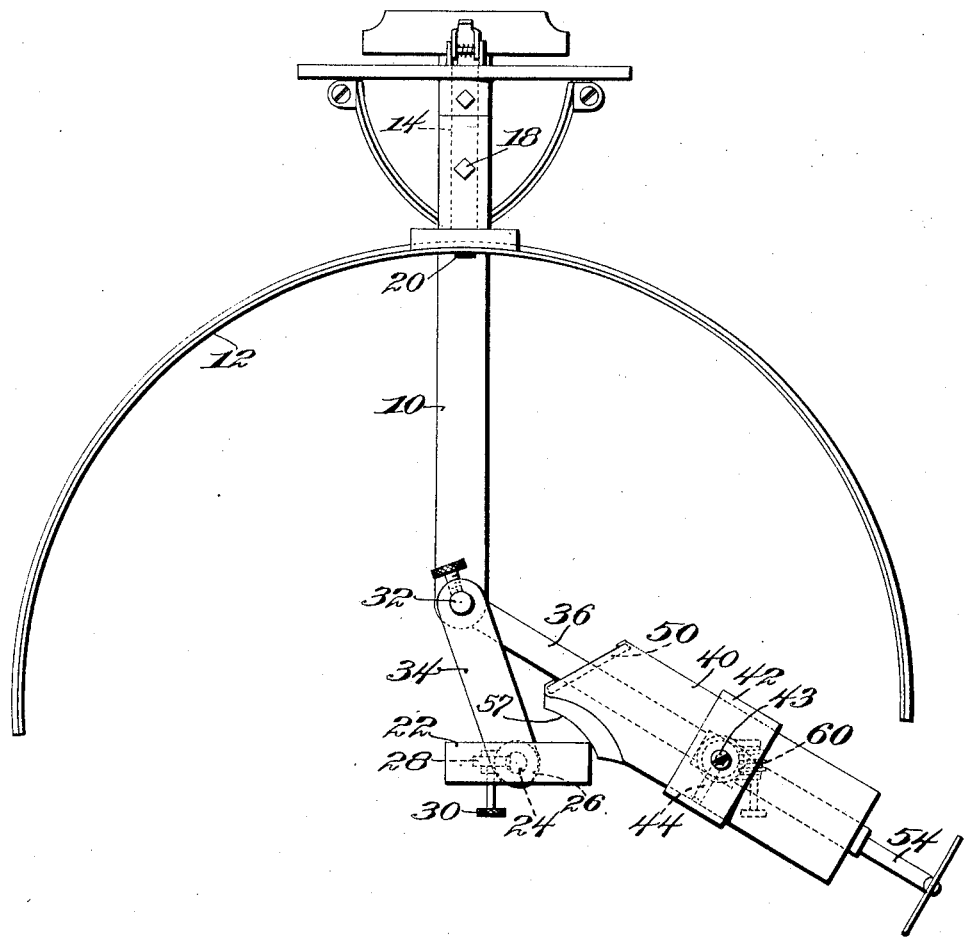

Patented Nov. 12, 1929

1,735,005

UNITED STATES PATENT OFFICE

EDWARD B. KIRK, OF BOSTON, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS

APPARATUS FOR TESTING EYES

Application filed January 25, 1926. Serial No. 83,458.

The present apparatus is designed for accurately measuring or determining the field of vision of one or both eyes, and is employed particularly in connection with certain diseases of the eye which may be diagnosed by determining the extent to which the normal field of vision has been encroached upon.

The present invention is intended to overcome the defects inherent in existing apparatus which preclude an accurate determination of the field of vision in all cases. According to the present invention, an accurate measurement of the entire field of vision of both eyes may be plotted and from such a measurement the extent of diseases of the eye, such as glaucoma, may be determined. In addition to permitting a full measurement of the entire field of vision, the present invention permits a determination of the field of vision in cases where the sight of one eye may be impaired in such a manner that the observer is unable to focus directly upon a target or object with the eye so impaired.

With these and other objects in view, one feature of the invention contemplates the provision of an observing surface with a fixed object located in the direct line of vision of one eye, a second object located at one side of the direct field of vision, and a reflecting surface mounted in front of the second eye and designed to permit focusing of the second eye upon the second object.

A still further feature of the invention contemplates the provision of means for moving the second object and reflecting surface to opposite sides of the first-mentioned object in order to permit either eye to be focused upon the first-mentioned object and the eye not under test on the second object.

Still further features of the invention consist in certain novel features of construction, combinations and arrangements of parts hereinafter described and claimed, the advantages of which will be obvious to those skilled in the art from the following description.

In the accompanying drawings illustrating the preferred form of the invention,

Fig. 1 represents a top plan view of the improved apparatus;

Fig. 2 is an elevation of the apparatus shown in Fig. 1; and

Fig. 3 is a second elevation of the apparatus partly in section taken at right angles to the view shown in Fig. 2.

Referring to the accompanying drawings, the apparatus may be mounted upon a standard 10 having an observing surface 12 formed in the arc of a circle, the center of which is substantially coincident with the position of the eye under observation in order that all portions of the observing surface shall be substantially equidistant from the eye. The observing surface 12 in the form of a curved semi-circular band may be mounted upon a shaft 14 revolubly supported in the upper portion 16 of the standard in such a manner that the band may be swung into different angular positions to determine the field of vision throughout the entire meridian. The band may be retained in adjusted position by a set screw 18 engaging with the shaft 14. The band is conveniently provided with a fixed object 20 located in the direct line of vision of the eye under observation. In testing the eyes the head is supported by a chin rest 22 formed upon a stem 24 which is vertically adjustable within a bracket 26. This adjustment may be accomplished in the usual manner through a rack and pinion indicated at 28 and operated by a knob member 30. The bracket 26 is mounted on a vertical stem 32 forming a part of the standard 10, and is provided with a rearward projection 34 for a purpose to be presently described. Revolubly mounted on the stem 32, see Fig. 1, is a second support 36 provided with a post 58 which carries at its upper end a hollow tubular member 40. This tubular member is mounted in a supporting ring 42, and through the provisions of a stud 43 and cooperating slot 44 formed in the tubular member 40 may be turned through an angle of 180° within the ring. Supported in the end of the tube and in line with the eye not under observation is a reflecting surface 50, such as a mirror, which is adapted to permit the second eye to focus upon a fixed object 52 supported upon the upper end of an arm 54 which telescopes at its lower end in the support 36, as indicated in Figs. 2 and 3. The reflecting surface is positioned at an angle with respect to the axis of the tube 40, such that the eye looking at the reflecting surface through the opening 57 in the tube 40 focuses on the object 52 which is positioned in line with the opposite open end of the tube. The tube may be swiveled with respect to the post 58 by an adjusting mechanism consisting of a worm and gear, as indicated generally at 60, and the object 52 may be adjusted toward and from the reflecting surface through the telescoping connection between the arm 54 and support 36, a set screw 64 maintaining the desired adjustment. With this construction, the apparatus may be so adjusted that the two objects 20 and 52 are located at approximately the same distance from each eye and the tube 40 may be angularly adjusted to bring the object into direct alignment with the axis of the tube. With the apparatus positioned as indicated in the drawings, the eye under observation is in direct line of the fixed object 20 and the accompanying eye focused upon the object 52 through the reflecting surface 50. After the field of vision of the eye under observation has been plotted, the support 36 carrying the tube 40 and arm 54 is swung through an arc to bring it upon the opposite side of the fixed object 20. Thereafter the tube 40 is turned to reverse the position of the mirror and the right instead of the left eye may then be focused upon the fixed object 20, the accompanying eye focusing upon the object 52. The position of the tube 40 and object 52 is determined in each case by a stop collar 70 fixed to the stem 32 below the support 36 and having a recess 72 which is engaged by a projection 74 formed in the hub of the support 36.

In the actual operation of the apparatus, the chin of the patient is supported upon the rest 22 and the parts adjusted to bring the two eyes into alignment with the object 20 and the reflecting surface 50. Thereafter a third object is moved along the surface of the band 12 toward the fixed object 20 until it comes into the field of observation of the patient. Having determined the limits of the field in one position of the band, the latter is then turned about the supporting shaft and the field plotted in a second position of the band. This is repeated throughout the entire meridian until the complete field with one eye has been determined. Thereafter the support 36 is turned to permit the operation to be repeated for the accompanying eye, and its field of vision may be plotted in a like manner. It will be evident that owing to the stereoscopic effect obtainable by focusing with both eyes upon fixed objects, a determination of the field of vision may be obtained even though the sight of the eye under observation is so impaired as to prevent direct focusing of this eye upon the fixed object 20. In addition, by causing the eye not under observation to be focused upon an object located at one side of the direct field of vision, the desired stereoscopic effect may be obtained without interfering or limiting the field of vision nasally as would otherwise be the case if it were attempted to focus the two eyes upon fixed objects located adjacent one another and with the fields of vision separated by a partition or similar devices.

The direct field of vision, as this terminology is employed throughout the specification and claims, is intended to denote the field of vision in which the eyes may be focused on an object and includes all lines of fixation for either eye.

What is claimed is:

1. Apparatus of the class described comprising two relatively fixed objects one within and one without the direct field of vision of the two eyes of the patient, a surface which permits recording of the field of vision of an eye under test and upon which the object within the direct field of vision is mounted, means interposed in the direct vision of the eye not under test designed to deflect light rays to afford vision of the object without the direct field of vision, and means for supporting the head of the patient in position to permit simultaneous focusing of the eyes upon the respective objects.

2. Apparatus of the class described comprising two relatively fixed objects one within and one without the direct field of vision of the two eyes of the patient, an arcuate perimeter upon which the object within the direct field of vision is mounted, means interposed in the direct vision of the eye not under test designed to deflect light rays to afford vision of the object without the direct field of vision, and means for supporting the head of the patient in position to permit simultaneous focusing of the eyes upon the respective objects.

3. Apparatus of the class described comprising two relatively fixed objects one within and one without the direct field of vision of the two eyes of the patient, an arcuate perimeter upon which the object within the direct field of vision is mounted, means for supporting the perimeter to permit rotation of its surface in any meridian plane without altering the position of the object thereon, means interposed in the direct vision of the eye not under test designed to deflect light rays to afford vision of the object without the direct field of vision, and means for supporting the head of the patient in position to permit simultaneous focusing of the eyes upon the respective objects.

4. Apparatus of the class described comprising two relatively fixed objects one within and one without the direct field of vision of the two eyes of the patient, a supporting surface upon which the object within the direct field of vision is mounted, means interposed in the direct vision of the eye not under test designed to deflect light rays to afford vision of the object without the direct field of vision, a tubular member substantially limiting the field of vision through the light deflecting means to the second object, means for permitting adjustment of the second object toward and from the light deflecting means, and means for supporting the head of the patient in position to permit simultaneous focusing of the eyes upon the respective objects.

5. Apparatus of the class described comprising two relatively fixed objects, one within and one without the direct field of vision of the two eyes of the patient, a supporting surface upon which the object within the direct field of vision is mounted, means interposed in the direct vision of the eye not under test designed to deflect light rays to afford vision of the object without the direct field of vision, a head-rest designed to permit simultaneous focusing of the eyes upon the respective objects, means permitting vertical adjustment of the head-rest, and a support for the light deflecting means and the second object movable to opposite sides of the head-rest.

6. Apparatus of the class described comprising two relatively fixed objects one within and one without the direct field of vision of the two eyes of the patient, means interposed in the direct vision of the eye not under test designed to deflect light rays to afford vision of the object without the direct field of vision, means for relatively moving the two objects to permit them to be positioned equidistant from both eyes, and means for supporting the head of the patient in position to permit simultaneous focusing of the eyes upon the respective objects.

7. Apparatus of the class described comprising two relatively fixed objects one within and one without the direct field of vision of the two eyes of the patient, a supporting surface upon which the object within the direct field of vision is mounted, means interposed in the direct vision of the eye not under test designed to deflect light rays to afford vision of the object without the direct field of vision, and means for supporting the head of the patient to permit simultaneous focusing of the eyes upon the respective objects, the head supporting means and light deflecting means having provision for relative vertical movement.

8. Apparatus of the class described comprising two relatively fixed objects one within and one without the direct field of vision of the two eyes of the patient, a supporting surface upon which the object within the direct field of vision is mounted, means interposed in the direct vision of the eye not under test designed to deflect light rays to afford vision of the object without the direct field of vision, means for supporting the head of the patient in position to permit simultaneous focusing of the eyes upon the respective objects, and means for moving the light deflecting means and object without the direct field of vision to opposite sides of the head supporting means to permit focusing of either eye upon the second object.

9. In a device of the character described, a head support, a member having a fixation object aligned with the eye under test as positioned by the head support, a tubular member having an eye opening supported in line with the eye not under test, said tube extending in a line normal to the axis of the eye opening and away from the line of vision of the eye under test, an inclined reflector behind the opening adapted to reflect an image of an object aligned with the axis of the tube into the eye not under test, and a member having a fixation object aligned with the axis of the tube.

10. In a device of the character described, a head support, a member having a fixation object aligned with the eye under test as positioned by the head support, a tubular member having an eye opening supported in line with the eye not under test, said tube extending in a line normal to the axis of the eye opening and away from the line of vision of the eye under test, an inclined reflector behind the opening adapted to reflect an image of an object aligned with the axis of the tube into the eye not under test, a member having a fixation object beyond the reflector and aligned with the axis of the tube, and means to move said member back and forth in said axial direction.

11. In combination with a head rest and an aligned fixation object for the eye under test, a tubular member having an eye opening supported in line with the eye not under test, said tube extending in a line normal to the axis of the eye opening and away from the line of vision of the eye under test, an inclined reflector behind the opening adapted to reflect an image of an object aligned with the axis of the tube into the eye not under test, a member having a fixation object aligned with the axis of the tube, and a bearing member supporting the tube for rotative axial movement therein.

12. In combination with a head rest and an aligned fixation object for the eye under test, a tubular member having an eye opening supported in line with the eye not under test, said tube extending in a line normal to the axis of the eye opening and away from the line of vision of the eye under test, an inclined reflector behind the opening adapted to reflect an image of an object aligned with the axis of the tube into the eye not under test, a member having a fixation object aligned with the axis of the tube, a bearing member supporting the tube for rotative axial movement therein, and a support for the tube whereon it may rotate in a direction transverse to its axis.

13. In combination with a head rest and an aligned fixation object for the eye under test, means for raising and lowering the head rest relative to the fixation object, an arm pivoted on the head rest support for movement in a horizontal plane, a second rod vertically supported on the first, a support on the second rod axially rotatable thereon, a bearing member on said support, a tubular member in said bearing axially rotatable therein and having an eye opening supported in line with the eye not under test, said tube extending in a line normal to the axis of the eye opening and away from the line of vision of the eye under test, an inclined reflector behind the opening adapted to reflect an image of an object aligned with the axis of the tube into the eye not under test, a member having a fixation object aligned with the axis of the tube, and means to move said member back and forth in said axial direction.

14. In combination with a head rest and an aligned fixation object for the eye under test, an arm pivotally supported on the head rest for rotative movement in a horizontal plane, an arm carried by the first arm and extending in a vertical plane, a third arm carried by the first arm and projecting transversely therefrom, a chart support on the third arm, a tubular member having an eye opening aligned with the head rest, the axis of said tube extending substantially parallel with the first arm, means for supporting the tube whereby it may be rotated in a horizontal plane, and means for supporting the tube so that it may be axially rotated in its support.

15. In combination with a head rest and an aligned fixation object for the eye under test, an arm pivotally supported on the head rest for rotative movement in a horizontal plane, an arm carried by the first arm and extending in a vertical plane, a third arm carried by the first arm and extending transversely thereto, slide means connecting the first and third arms, a chart supported by the third arm, a tubular member having an eye opening aligned with the eye not under test as fixed by the head rest, the axis of said tube extending substantially parallel with the first arm, means for supporting the tube so that it may be rotated in a horizontal plane, and means for supporting the tube so that it may be axially rotated in its support.

16. In combination with a head rest and an aligned fixation object for the eye under test, an arm pivotally supported on the head rest for rotative movement in a horizontal plane, an arm carried by the first arm and extending in a vertical plane, a third arm carried by the first arm and extending transversely thereto, slide means between the first and third arms, means to lock the slide means in desired position, a chart supported on the third arm, a tubular member having an eye opening aligned with the eye not under test as fixed by the head rest, the axis of said tube extending substantially parallel to the first arm, means for supporting the tube so that it may be rotated in a horizontal plane, and means for supporting the tube so that it may be axially rotated in its support.

17. In combination with a head rest and an aligned fixation object for the eye under test, a supporting arm pivotally secured to the head rest for rotative movement in a horizontal plane, a second arm supported by the first arm and extending vertically therefrom, a third arm supported by the first arm and extending transversely therefrom, slide means between the first and third arms, a chart supported on the third arm, a tubular member having an eye opening aligned with the eye not under test as fixed by the head rest, the axis of the tube being substantially parallel to the first supporting arm, a support for the tube rotatable on the second arm so that the tube may move in a horizontal plane, a ring support carried by the second support and embracing the tube so that it may be rotated axially therein, and an inclined reflector in the tube behind the eye opening adapted to reflect the image of an object aligned therewith into the eye not under test.

18. In combination with a head rest and an aligned fixation object for the eye under test, a supporting arm pivotally secured to the head rest for rotative movement in a horizontal plane, a second arm supported by the first arm and extending vertically therefrom, a third arm supported by the first arm and extending transversely thereto, slide means between the first and third arms, a chart supported on the third arm, a tubular member having an eye opening aligned with the eye not under test as fixed by the head rest, the axis of the tube being substantially parallel to the first supporting arm, a support for the tube rotatable on the second arm so that the tube may move in a horizontal plane, a ring support carried by the second support and embracing the tube so that it may be rotated axially therein, an inclined reflector in the tube behind the eye opening adapted to reflect the image of an object aligned with the axis of the tube into the eye not under test.

19. In combination with a head rest and an aligned fixation object for the eye under test, a supporting arm pivotally secured to the head rest for rotative movement in a horizontal plane, a second arm supported by the first arm and extending vertically therefrom, a third arm supported by the first arm and extending transversely thereto, slide means between the first and third arms, a chart supported on the third arm, a tubular member having an eye opening aligned with the eye not under test as fixed by the head rest, the axis of the tube being substantially parallel to the first supporting arm, a support for the tube rotatable on the second arm so that the tube may move in a horizontal plane, a ring support carried by the second support and embracing the tube so that it may be rotated axially therein, an inclined reflector in the tube behind the eye opening adapted to reflect the image of an object aligned with the axis of the tube into the eye not under test, means to lock the movement of the tube in desired position in the horizontal plane, and means to regulate the movement of the tube in its ring bearing.

20. The combination with a perimeter comprising a head suport which fixes the eye sighting point, a fixed eye fixation point aligned with the eye sighting point as determined by the eye under test, an arcuate member supported in one plane at the eye sighting point of the eye under test and pivoted for rotation in a plane normal to the first plane about the fixed eye fixation point, of a movable eye fixation object positioned at one side of the line through the fixed eye fixation object and the eye sighting point as determined by the eye under test and a movable reflector alignable with the eye not in line with the fixed fixation object and alignable with the movable fixation object whereby the said eye will see the movable fixation object in said reflector.

21. The combination with a perimeter comprising a head rest which fixes the eye sighting point of the eye under test, a fixed eye fixation point aligned with the said eye sighting point, an arcuate member supported in one plane at the eye sighting point and pivoted for rotation in a plane normal to the first plane about the fixed eye fixation point, of a movable eye fixation object positioned at one side of the line through the fixed eye fixation object and the eye sighting point, a movable reflector alignable with the eye not in line with the fixed fixation object and alignable with the movable fixation object whereby the said eye will see the movable fixation object in said reflector, and means for shifting the reflector and the movable fixation object from one side of the line through the eye sighting point and the aligned fixation object to the other.

22. In combination with a perimeter comprising a head rest which fixes the eye sighting point for the eye under test, a fixed eye fixation point aligned with the eye sighting point, an arcuate member supported in one plane at the eye sighting point and pivoted for rotation in a plane normal to the first plane about the fixed eye fixation point, of a second eye fixation object positioned at one side of the line through the fixed eye fixation object and the said eye sighting point, a reflector alignable with the eye not in line with the fixed fixation object and alignable with the second fixation object whereby the said eye will see the second fixation object in the said reflector.

23. Apparatus of the class described comprising two relatively fixed objects one within and one without the direct field of vision of the two eyes of the patient, a supporting surface upon which the object in the direct field of vision is mounted, means interposed in the direct vision of the eye not under test designed to deflect light rays to afford vision of the object without the direct field of vision, an enclosing member substantially limiting the field of vision by means of the light deflecting means to the second object, a support for the enclosing member, means to move the enclosing member on its support to vary the angular position of the reflecting means, and means for supporting the head of the patient in position to permit focusing of the eyes upon the respective objects.

24. Apparatus of the class described comprising two relatively fixed objects one within and one without the direct field of vision of the two eyes of the patient, a supporting surface upon which the object in the direct field of vision is mounted, means to deflect light rays to afford vision of the object without the direct field of vision, an enclosing member substantially limiting the field of vision by means of the light deflecting means to the second object, a support for the enclosing member and the second object, means for permitting adjustment of the second object toward and away from the light deflecting means, and means for supporting the head of the patient in position to permit focusing of the eyes upon the respective objects.

25. Apparatus of the class described comprising two relatively fixed objects one within and one without the direct field of vision of the two eyes of the patient, a supporting surface upon which the object within the direct field of vision is mounted, means to deflect light rays to afford vision of the object without the direct field of vision, an enclosing member substantially limiting the field of vision by means of the light deflecting means to the second object, a support for the enclosing member and the second object, means for supporting the head of the patient in position to permit simultaneous focusing of the eyes upon the respective objects, and means for moving the light deflecting means and object without the direct field of vision to opposite sides of the head supporting means to permit focusing of either eye upon the second object.

26. Apparatus of the class described comprising two relatively fixed objects one within and one without the direct field of vision of the two eyes of the patient, a supporting surface upon which the object within the direct field of vision is mounted, means to deflect light rays to afford vision of the object without the direct field of vision, an enclosing member substantially limiting the field of vision by means of the light deflecting means to the second object, a support for the enclosing member and the second object, a sight opening in the enclosing member affording vision of the second object in the light deflecting means, means for supporting the head of the patient in position to permit simultaneous focusing of the eyes upon the respective objects, means for moving the light deflecting means and second object to opposite sides of the head supporting means to permit focusing of either eye upon the second object, and means to rotate the enclosing member on its support to bring the sight opening into line with the eye of the patient when the light deflecting means and the second object are moved to opposite sides of the head supporting means.

27. Apparatus of the class described comprising two relatively fixed objects one within and one without the direct field of vision of the two eyes of the patient, a supporting surface upon which the object without the direct field of vision is mounted, means interposed in the direct vision of the eye not under test designed to deflect light rays to afford vision of the object without the direct field of vision, an enclosing member substantially limiting the field of vision by means of the light deflecting means to the second object, a support for the enclosing member and the second object, a sight opening in the enclosing member affording vision of the second object in the light deflecting means, means for supporting the head of the patient in position to permit simultaneous focusing of the eyes upon the respective objects, means for moving the light deflecting means and second object to opposite sides of the head supporting means to permit focusing of either eye upon the second object, an annular member on the support for the enclosing member, a slot in the enclosing member aligned with the annular member, means in the annular member to locate in the slot whereby the enclosing member may be rotated in the annular member to bring the sight opening into line with the eye of the patient when the light deflecting means and the second object are moved to opposite sides of the head supporting means.

28. Apparatus of the class described comprising two relatively fixed objects one within and one without the direct field of vision of the two eyes of the patient, a supporting surface upon which the object within the direct field of vision is mounted, means to deflect light rays to afford vision of the object without the direct field of vision, an enclosing member substantially limiting the field of vision by means of the light deflecting means to the second object, a support for the enclosing member and the second object, adjustable means for supporting the head of the patient in position to permit simultaneous focusing of the eyes upon the respective objects, means for moving the light deflecting means and object without the direct field of vision to apposite sides of the head supporting means to permit focusing of either eye upon the second object, and means for limiting the amount of movement of the light deflecting means to opposite sides of the head supporting means.

29. In a device of the character described, a head support for fixing the eye position of the eye under test, a member having a fixation object positioned in front of the eye under test and aligned therewith, an arm support positioned to one side of the eye position and extending in a direction laterally away from said eye position and at an angle to the aligned sight line of the eye under test, a reflector support on the arm support, a reflector on the reflector support aligned with the eye not under test, a target support on the arm support spaced from the reflector support, and a member having a fixation object on the target support and aligned with the reflcetor.

30. In a device of the character described, a head support for fixing the eye position of the eye under test, a member having a fixation object positioned in front of the eye under test and aligned therewith, an arm support positioned to one side of the eye position and extending in a direction laterally away from said eye position at an angle to the aligned sight line of the eye under test, a reflector support on the arm support, a reflector on the reflector support aligned with the eye not under test, a target support on the arm support spaced from the reflector support, a member having a fixation object on the target support and aligned with the reflector and means to change the relative distance between the eye position and the arm support.

31. In a device of the character described, a head support for fixing the eye position of the eye under test, a member having a fixation object positioned in front of the eye under test and aligned therewith, an arm support positioned to one side of the eye position and extending in a direction laterally away from said eye position and at an angle to the aligned sight line of the eye under test, a reflector support on the arm support, a reflector on the reflector support aligned with the eye not under test, a target support on the arm support spaced from the reflector support, a member having a fixation object on the target support and aligned with the reflector and means to move the target support longitudinally on the arm support to change the relative distance between the fixation object on the target support and the reflector.

32. In a device of the character described, a head support for fixing the eye position of the eye under test, a member having a fixation object positioned in front of the eye under test and aligned therewith, an arm support positioned to one side of the eye position and extending in a direction laterally away from said eye position and at an angle to the aligned sight line of the eye under test, a reflector support on the arm support, a reflector on the reflector support aligned with the eye not under test, a target support on the arm support spaced from the reflector support, a member having a reflector and means to move the reflector support longitudinally on the arm support to change the relative distance between the reflector and the fixation object on the target support.

33. In a device of the character described, a head support for fixing the eye position of the eye under test, a member having a fixation object positioned in front of the eye under test and aligned therewith, an arm support positioned to one side of the eye position and extending in a direction laterally away from said eye position and at an angle to the aligned sight line of the eye under test, a reflector support on the arm support, a reflector on the reflector support aligned with the eye not under test, a target support on the arm support spaced from the reflector support, a member having a fixation object on the target support and aligned with the reflector, means to pivot the mirror support whereby it may be swung in a plane normal to the axis of the arm support, and means for pivoting the target support whereby it may be swung in a plane normal to the axis of the arm support.

34. In a device of the character described, a head support for fixing the eye position of the eye under test, a member having a fixation object positioned in front of the eye under test and aligned therewith, an arm support positioned to one side of the eye position and extending in a direction laterally away from said eye position and at an angle to the aligned sight line of the eye under test, a reflector support on the arm support, a reflector on the reflector support aligned with the eye not under test, a target support on the arm support spaced from the reflector support, a member having a fixation object on the target support and aligned with the reflector and means to rotate the fixation object member axially in a plane normal to the axis of said arm support.

35. In a device of the character described, a head support for fixing the eye position of the eye under test, a member having a fixation object positioned in front of the eye under test and aligned therewith, a support positioned to one side of the eye position and extending in a direction laterally away from said eye position at an angle to the aligned sight line of the eye under test, a reflector on said support aligned with the eye not under test, a member having a fixation object on said support spaced from and aligned with the reflector, and means for swinging said support with its reflector and fixation object from one side of the eye positioning member to the other.

In testimony whereof I have signed my name to this specification.

EDWARD B. KIRK.